(12) United States Patent
Kobayashi et al.

(10) Patent No.: US 8,204,099 B2
(45) Date of Patent: *Jun. 19, 2012

(54) SIGNAL PROCESSING UNIT AND WIRELESS COMMUNICATION DEVICE

(75) Inventors: Kaoru Kobayashi, Chitose (JP); Shigeru Takegishi, Chitose (JP)

(73) Assignee: Nihon Dempa Kogyo Co., Ltd, Tokyo (JP)

( * ) Notice: Subject to any disclaimer, the term of this patent is extended or adjusted under 35 U.S.C. 154(b) by 594 days.

This patent is subject to a terminal disclaimer.

(21) Appl. No.: 12/382,157

(22) Filed: Mar. 10, 2009

(65) Prior Publication Data

US 2009/0180525 A1    Jul. 16, 2009

Related U.S. Application Data

(63) Continuation of application No. PCT/JP2007/074139, filed on Dec. 14, 2007.

(30) Foreign Application Priority Data

Jan. 19, 2007    (JP) .................................. 2007-010654

(51) Int. Cl.
    *H04B 1/69*    (2011.01)
(52) U.S. Cl. ........ 375/150; 375/343; 375/259; 375/260; 370/335; 370/350
(58) Field of Classification Search .................. 375/150, 375/343, 260, 259; 370/335, 350
    See application file for complete search history.

(56) References Cited

U.S. PATENT DOCUMENTS

| | | | | |
|---|---|---|---|---|
| 6,658,063 B1 * | 12/2003 | Mizoguchi et al. | ........... | 375/260 |
| 6,965,586 B1 * | 11/2005 | Maruyama | ............. | 370/335 |
| 2004/0081248 A1 * | 4/2004 | Parolari | ........................ | 375/259 |
| 2008/0170644 A1 * | 7/2008 | Kleider et al. | ................. | 375/343 |
| 2009/0196331 A1 * | 8/2009 | Kobayashi et al. | ........... | 375/150 |
| 2009/0279646 A1 * | 11/2009 | Kobayashi et al. | ........... | 375/343 |
| 2011/0026648 A1 * | 2/2011 | Swarts et al. | .................. | 375/343 |

FOREIGN PATENT DOCUMENTS

| | | |
|---|---|---|
| JP | 11-196026 | 7/1999 |
| JP | 2000-115027 | 4/2000 |
| JP | 2001-308744 | 11/2001 |
| JP | 2002-280974 | 9/2002 |
| JP | 2002-290272 | 10/2002 |
| JP | 2006-246059 | 9/2006 |
| JP | 2006-261985 | 9/2006 |

OTHER PUBLICATIONS

International Search Report dated Jan. 29, 2008.

* cited by examiner

*Primary Examiner* — Eva Puente
(74) *Attorney, Agent, or Firm* — Jacobson Holman PLLC

(57) ABSTRACT

A signal processing unit and a wireless communication device are comprised of a carrier data generating unit; a carrier demodulation unit; a matched filter unit that outputs correlation peak detected data; a correlation peak detecting unit that detects a correlation peak from the correlation detected data and outputs correlation peak position information; a coarse frequency deviation detecting unit that detects a frequency component in accordance with a carrier frequency deviation amount with respect to carrier demodulated data and outputs a frequency deviation amount to the carrier data generating unit; a fine frequency deviation detecting unit that outputs a fine frequency deviation amount to reduce the frequency deviation amount from the correlation detected data and the correlation peak position information to the carrier data generating unit; and a control unit that inputs the correlation peak position information and adjusts a processing clock signal.

12 Claims, 13 Drawing Sheets

SIGNAL PROCESSING UNIT AND WIRELESS COMMUNICATION DEVICE

This is a Continuation of PCT/JP2007/074139 filed Dec. 14, 2007 and published in Japanese.

BACKGROUND OF THE INVENTION

1. Field of the Invention

The present invention relates to a wireless communication device which is adapted for use in a bidirectional wireless system and, more particularly, to a wireless communication device and a signal processing unit which are able to enhance sensitivity in a correlation peak detection processing.

2. Description of the Related Art

[Bidirectional Wireless System: FIG. 12]

A wireless communication device that has been conventionally used in a bidirectional wireless system adopts a spread spectrum scheme to operate in weak radio waves.

The conventional bidirectional wireless system will be described with reference to FIG. 12. FIG. 12 is a schematic diagram illustrating the conventional bidirectional wireless system.

The conventional bidirectional wireless system is provided with a wireless communication device as a master device 1 which has a transmitting unit 1a and a receiving unit 1b, and a wireless communication device as a slave device 2 which has a transmitting unit 2a and a receiving unit 2b. The conventional bidirectional wireless system transmits operation commands from the slave device 2 to the master device 1 by operating an input device of the slave device 2, so that the master device 1 is operated according to the commands.

The master device 1 is to transmit responses to transmission states of the commands or state information of the master device 1 to the slave device 2.

That is, the conventional bidirectional wireless system is a weak wireless system capable of performing bidirectional communication (half duplex) adopting the SS.

In the bidirectional wireless system, the slave device 2 plays a leading role in operation. The master device 1 receives the commands from the slave device 2 by intermittently receiving the transmission from the slave device 2, and the slave device 2 is put into an operation mode only when it is to be operated. Therefore, it is possible to significantly reduced power consumption.

[Configuration of Conventional Signal Processing Unit: FIG. 13]

A signal processing unit in the wireless communication device will be described with reference to FIG. 13. FIG. 13 is a block diagram illustrating a configuration of a conventional signal processing unit.

The conventional signal processing unit is provided with an ADC (Analog Digital Converter) control unit 11, an AGC (Auto Gain Control) unit 12, APC/AFC (Auto Power Control/Auto Frequency Control) control unit 13, a DAC (Digital Analog Converter) control unit 14, a carrier demodulating unit 15, a carrier data generating unit 16, a carrier modulating unit 17, a receiving data decoding unit 18', a spread code generating unit 20', a spread modulating unit 21', a correlation peak detecting unit 22', a coarse frequency deviation detecting unit 23', and a fine frequency deviation detecting unit 24'.

Parts of the conventional signal processing unit will now be described in detail.

The ADC control unit 11 performs control to generate a control signal for the A/D converter (designated as "A/D"), and to receive a receiving IF (Intermediate Frequency) signal as an input signal from the A/D converter.

The AGC unit 12 controls a gain control signal which is outputted to the AGC amplifier in a wireless communication unit, so that the receiving IF signal output coming from the ADC control unit 11 may always be kept to have a predetermined amplitude.

The APC/AFC control unit 13 receives, as an input thereto, the control signal for monitoring temperature of the wireless communication unit from the A/D converter using a thermistor, and outputs an AFC correction value and an APC correction value to the carrier data generating unit 16 and the carrier modulating unit 17, respectively, with respect to the monitored value.

The DAC control unit 14 delivers data, which is modulated in carrier by the carrier modulating unit 17, to the D/A converter.

The carrier demodulating unit 15 performs a processing of removal of an IF carrier component with respect to the receiving IF signal which is outputted from the ADC control unit 11 and further a down sample processing on the afore-processed signal, and then outputs the eventual signal to the receiving data decoding unit 18', the correlation peak detecting unit 22', and the coarse frequency deviation detecting unit 23', respectively.

The carrier data generating unit 16 performs a frequency correction processing according to a frequency deviation value or the like from the coarse frequency deviation detecting unit 23' and the fine frequency deviation detecting unit 24', and generates IF carrier data to be supplied to the carrier demodulating unit 15 and the carrier modulating unit 17.

The carrier modulating unit 17 performs an APC correction processing according to an APC correction request from the APC/AFC control unit 13, with respect to the IF carrier data which is supplied from the carrier data generating unit 16, and also performs the carrier modulation processing with the IF carrier data, with respect to spread modulation processing data which is input from the spread modulating unit 21'.

The receiving data decoding unit 18' detects a synchronizing word after performing a fine frequency correction of a synchronized IF carrier frequency, and performs a demodulation processing of user data.

The spread code generating unit 20' generates a spread code which is used in performance of a spread modulation and a reverse spread processing. At this stage, two types of spread codes are necessary to be used for synchronizing word/REF (Reference) data and for the user data.

The spread modulating unit 21' performs a differentially-encoding processing of the synchronizing word/REF data and the spread modulation processing of the transmission user data and the synchronizing word/REF data after being differentially encoded.

The correlation peak detecting unit 22' performs a correlation processing on a carrier demodulated data which is outputted from the carrier demodulating unit 15 to perform a correlation peak detection.

The coarse frequency deviation detecting unit 23' detects residual frequency components according to an IF carrier frequency deviation amount between the master device and the slave device on the carrier demodulated data which is outputted from the carrier demodulating unit 15, and outputs the frequency deviation amount to the carrier data generating unit 16.

The fine frequency deviation detecting unit 24' performs frequency detection at a high accuracy on the correlation data of which a peak has been detected, in order to further decrease the frequency deviation amount, and outputs the fine frequency deviation amount to the carrier data generating unit 16.

Further, in the correlation peak detecting processing of the signal processing unit of the conventional wireless communication device, the peak detection is carried out by comparing a fixed threshold value or a complicatedly processed variable threshold value with respect to the detected correlation value.

[Prior Art]

Further, there are Japanese Patent Application Laid-Open No. 2000-115027 (Patent Document 1) and Japanese Patent Application Laid-Open No. 2002-290272 (Patent Document 2) as related prior arts.

Patent Document 1 discloses a spread spectrum communication method and a device thereof. In Patent Document 1, a correlation output is detected over a data region by a peak detector, and the detected data becomes a correlation peak. When the correlation peak value exceeds a threshold value of a comparator, a peak value and a peak position of the correlation peak are secured. Then, when the correlation peak value is larger than the threshold value in an observation region which is narrower than the data region and when detected over a predetermined number of times, the synchronization is established.

Patent Document 2 discloses a path detection device which detects a timing position of a path where a correlation waveform is maximized. In Patent Document 2, when a current synthesized over one period of a spread spectrum code is larger than the maximum value of a previous synthesized current in a period of time for counting clock pulses, memory is updated and the counted value is outputted.

However, in the correlation peak detecting processing of the signal processing unit of the conventional wireless communication device, since the peak detection is carried out by comparing the fixed threshold value or the complicatedly processed variable threshold value with respect to the detected correlation value, it is impossible to obtain a threshold value up to the limit with respect to a variation of the peak value generated under a weak electric field environment or from individual differences between devices in any case, so that a probability of false detection is increased. When a margin is designed to a certain extent, this leads to a problem that the sensitivity of detection is significantly degraded.

SUMMARY OF THE INVENTION

The present invention was made in consideration of the above-mentioned circumstances and hence, an object of the present invention is to provide a signal processing unit and a wireless communication device, which are able to enhance sensitivity in a correlation peak detection processing.

In order to solve the above-mentioned problems, according to an aspect of the invention, there is provided a signal processing unit which is adapted for use in a wireless communication device, comprising: a carrier data generating unit configured to carry out a frequency correction according to a frequency deviation amount to be received as an input and to generate carrier data; a carrier demodulating unit configured to demodulate a carrier of a received signal based on the carrier data and to output the carrier demodulated data; a matched filter unit configured to calculate, for the carrier demodulated data, a plurality of division correlation values by dividing said data and by further performing a despread processing and an accumulating operation processing as a partial correlation processing and to carry out a full addition processing on the plurality of division correlation values, to thereby output correlation detected value while outputting the plurality of division correlation values as a partial correlation detected value due to detection of a correlation peak; a correlation peak detecting unit configured to receive the correlation detected value as an input, to detect a maximum peak position in a 1-bit interval, and to compare the maximum peak position with a previous maximum peak position, wherein when the correlation peak is detected from the comparison result, the correlation peak detecting unit outputs position information of the correlation peak; a coarse frequency deviation detecting unit configured to carry out an FFT (Fast Fourier Transform) operation on the carrier demodulated data, to detect a frequency component according to a carrier frequency deviation amount, and to output a frequency deviation amount to the carrier data generating unit; a fine frequency detecting unit configured to carry out the FFT operation on the partial correlation detected value upon detecting the correlation peak and to output a fine frequency deviation amount which reduces the frequency deviation amount to the carrier data generating unit; and a control unit configured to receive the position information of the correlation peak as an input and to adjust a processing clock which becomes an operation timing in the correlation peak detecting unit and the coarse frequency deviation detecting unit. Therefore, it is possible to enhance the sensitivity in the correlation peak detection processing.

In accordance with the aspect of the present invention, with the above-mentioned signal processing unit, the correlation peak detecting unit comprises: a counter configured to output a counter value; a 1-bit interval maximum peak position detecting unit configured to receive a correlation detected value as an input from the matched filter unit and to detect a maximum peak position in a 1-bit interval by the counter value; a maximum peak position comparing unit configured to compare the counter value at the detected maximum peak position with a counter value at a previous maximum peak position and to output the comparison result; and a symbol synchronizing signal generating unit configured to output a correlation peak detected signal when the correlation peak is detected from the comparison result, and to output a symbol phase deviation detecting signal to the control unit when there is a symbol phase deviation. Therefore, it is possible to enhance the sensitivity in the correlation peak detection processing.

In accordance with the aspect of the present invention, with the above-mentioned signal processing unit, the 1-bit interval maximum peak position detecting unit is configured to detect a maximum correlation value every 1-bit interval from a start of detection processing and to carry out a processing for storing the counter value in an internal memory every time a maximum value is updated; the maximum peak position comparing unit, after the detection of the maximum value over a 2-bit interval is completed from the start of detection processing, is configured to compare a counter value at the maximum correlation value in the 2-bit interval with that in every interval and to output the comparison result to the symbol synchronous signal generating unit; and the symbol synchronizing signal generating unit, when the comparison result is in a predetermined range of deviation, determines that the comparison result is the correlation peak, and delivers a correlation peak detection signal. Therefore, it is possible to detect the correlation peak at a high accuracy.

In accordance with the aspect of the present invention, with the above-mentioned signal processing unit, the symbol synchronizing signal generating unit determines that the comparison result is the correlation peak, when the comparison result is in the predetermined range of deviation over continuous 3 bits. Therefore, it is possible to reduce a probability of false detection.

In accordance with the aspect of the present invention, with the above-mentioned signal processing unit, the 1-bit interval maximum peak position detecting unit secures the counter value upon carrying out the correlation peak detection as a reference value in a detection processing of a clock phase error; when the counter value of the maximum peak position detected after securing the reference value is in a range of predetermined values before and after the secured reference value, the maximum peak position comparing unit compares the counter value of the maximum peak position with the reference value; when the counter value at the maximum peak position is different from the reference value, the symbol synchronizing signal generating unit delivers the symbol phase deviation detecting signal, in which the difference between the counter value and the reference value is set as a phase error value, to the control unit; and the control unit carries out a phase adjustment processing on a processing clock according to the symbol phase deviation detecting signal as the phase error value. Therefore, it is possible to deal with the clock phase error.

According to another aspect of the invention, there is provided a wireless communication device comprising the above-mentioned signal processing unit. Therefore, it is possible to enhance the sensitivity in the correlation peak detection processing.

DESCRIPTION OF REFERENCE NUMERALS

Figure 1:
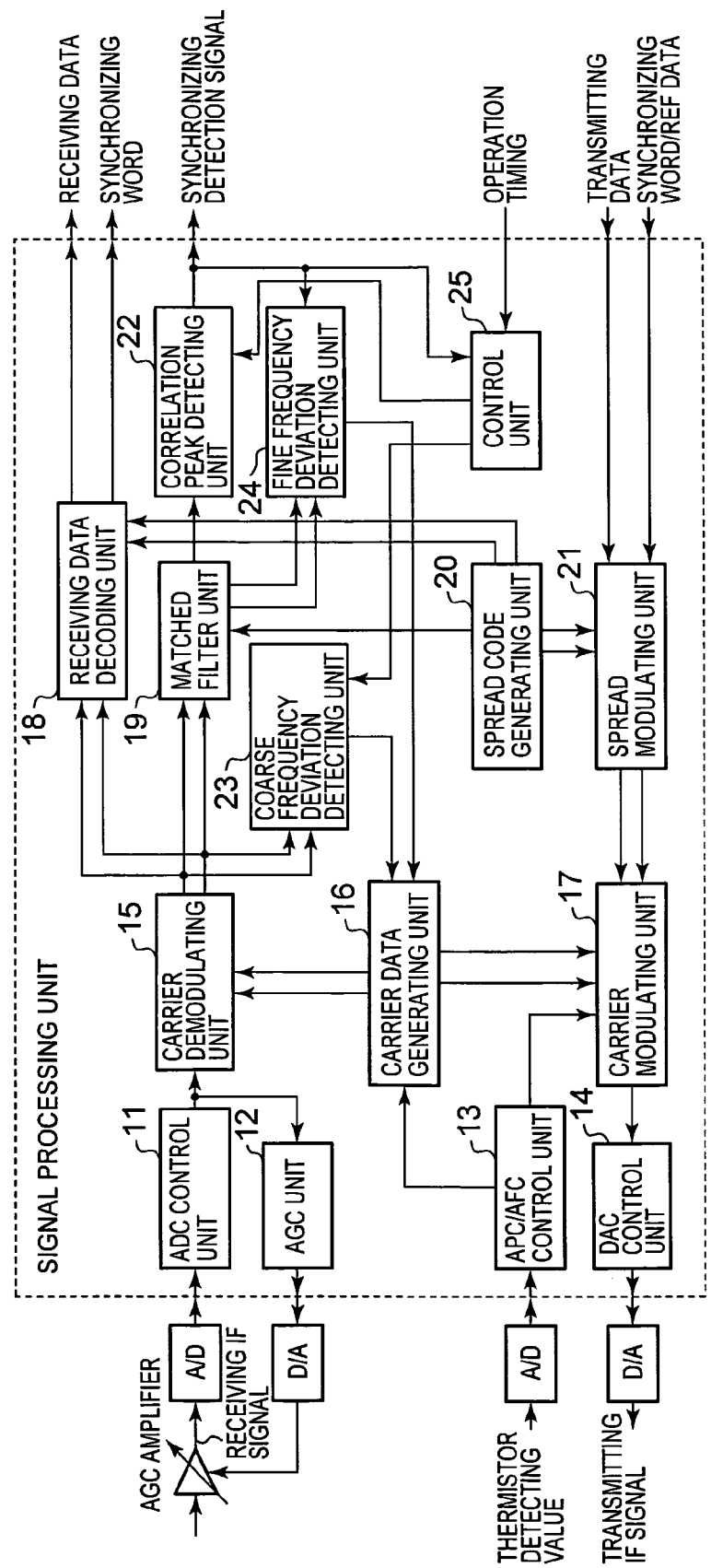
FIG. 1 is a block diagram illustrating a general configuration of a signal processing unit according to an embodiment of the invention.

1: wireless communication device (base station)
2: wireless communication device (portable equipment)
11: ADC control unit
12: AGC unit
13: APC/AFC control unit
14: DAC control unit
15: carrier demodulating unit
16: carrier data generating unit
17: carrier modulating unit
18, 18': receiving data decoding unit
19: matched filter unit
20, 20': spread code generating unit
21, 21': spread modulating unit
22, 22': correlation peak detecting unit
23, 23': coarse frequency deviation detecting unit
24, 24': fine frequency deviation detecting unit
25: control unit
151: IF carrier modulation processing unit
152: harmonic component removing unit
153: down sampling unit
161: AFC adjusting unit
162: index counter
163: address decoder
164: sine wave table
181: decimation filter
182: down sampling unit
183: low-frequency component removing unit
184: despread processing unit
185: division accumulation processing unit
186: partial correlation calculating processing unit
187: accumulation processing unit
188: delay detecting unit
189: code bit extracting unit
191: RAM read address generating unit
192: carrier demodulated data storing unit
193: spread code dividing unit
194: despread processing unit
195: accumulation processing unit
196: partial correlation calculating processing unit
197: full addition processing unit
198: shift register
201: control unit
202: code generation parameter table
203: code generating unit
204: code storing unit
205: SEL
211: differentially-encoding processing unit
212, 213, 214: spread modulation processing unit
221: 1-bit interval maximum peak position detecting unit
222: maximum peak position comparing unit
223: symbol synchronizing signal generating unit
224: free running counter
231: noise removing unit
232: down sampling unit
233: FFT operation processing unit
234: operation result accumulation processing unit
235: maximum peak position detecting unit
241: FFT operation processing unit
242: maximum peak position detecting unit

DESCRIPTION OF THE PREFERRED EMBODIMENT

An Embodiment of the present invention will be described with reference to the accompanying drawings.
An Embodiment of the present invention will be described with reference to the accompanying drawings.

Outline of Embodiment

In a signal processing unit according to the embodiment of the present invention, a carrier data generating unit generates carrier data; a carrier demodulating unit demodulates a carrier of a received signal based on the carrier data; a matched filter unit, for the carrier demodulated data, performs a despread processing and a full addition processing as a correlation processing and outputs correlation detected data; a correlation peak detecting unit detects a correlation peak from the correlation detected data, and outputs position information of the correlation peak; a coarse frequency deviation detecting unit, for the carrier demodulated data, detects a frequency component according to a carrier frequency deviation amount, and outputs a frequency deviation amount to the carrier data generating unit; a fine frequency detecting unit outputs a fine frequency deviation amount which reduces the frequency deviation amount from the correlation detected data upon detecting the correlation peak to the carrier data generating unit; and a control unit receives the position information of the correlation peak as an input and adjusts a processing clock. Therefore, it is possible to effectively enhance the detection sensitivity in the correlation peak detection processing by the operation of the matched filter unit and the correlation peak detecting unit.

Further, the correlation peak detecting unit of the signal processing unit according to the embodiment of the present invention, includes: a counter configured to output a counter value; a 1-bit interval maximum peak position detecting unit configured to receive a correlation detected value as an input from the matched filter unit and to detect a maximum peak position in a 1-bit interval by the counter value; a maximum peak position comparing unit configured to compare the counter value at the detected maximum peak position with a counter value at a previous maximum peak position and to output the comparison result; and a symbol synchronizing signal generating unit configured to output a correlation peak detected signal when the correlation peak is detected from the comparison result, and to output a symbol phase deviation detecting signal to the control unit when there is a symbol phase deviation. Therefore, it is possible to effectively enhance the detection sensitivity in the correlation peak detection processing.

Further, a wireless communication device according to the embodiment of the present invention includes the above-mentioned signal processing unit.

[Overall configuration of Signal Processing Unit: FIG. 1]

The signal processing unit (the present signal processing unit) according to the embodiment of the invention will be described with reference to FIG. 1. FIG. 1 shows a block diagram illustrating a configuration of the signal processing unit according to the embodiment of the invention.

As shown in FIG. 1, the signal processing unit according to the embodiment of the invention includes an ADC (Analog Digital Converter) control unit 11, an AGC (Auto Gain Control) unit 12, an APC/AFC (Auto Power Control/Auto Frequency Control) control unit 13, a DAC (Digital Analog Converter) control unit 14, a carrier demodulating unit 15, a carrier data generating unit 16, a carrier modulating unit 17, a receiving data decoding unit 18, a matched filter unit 19, a spread code generating unit 20, a spread modulating unit 21, a correlation peak detecting unit 22, a coarse frequency deviation detecting unit 23, a fine frequency deviation detecting unit 24, and a control unit 25.

[Parts]

Next, each part of the present signal processing unit will be described with reference to the drawings.

[ADC Control Unit 11]

The ADC control unit 11 reads a receiving IF (Intermediate Frequency) signal from an A/D converter IC (Integrated Circuit) and outputs the received signal to the carrier demodulating unit 15.

Further, the ADC control unit 11 generates and output a control signal to the A/D converter IC.

[AGC Unit 12]

The AGC unit 12 outputs a control signal for controlling a gain of the AGC amplifier in order to always be in predetermined amplitude with respect to the received signal output from the ADC control unit 11.

[APC/AFC Control Unit 13]

The APC/AFC control unit 13 generates and outputs a control signal to the A/D converter IC in order to monitor a temperature of the wireless communication unit (RF [Radio Frequency] unit) using a thermistor.

Further, the APC/AFC control unit 13 supplies an AFC correction value and an APC correction value to the carrier data generating unit 16 and the carrier modulating unit 17, respectively, according to the monitored value from the A/D converter IC.

Here, the APC means an automatic-transmission power control, and the AFC means an automatic frequency control, respectively.

[DAC Control Unit 14]

The DAC control unit 14 sends out data, which is modulated in carrier by the carrier modulating unit 17, to the D/A converter IC.

Further, the DAC control unit 14 generates and outputs a control signal to the D/A converter IC.

Figure 2:
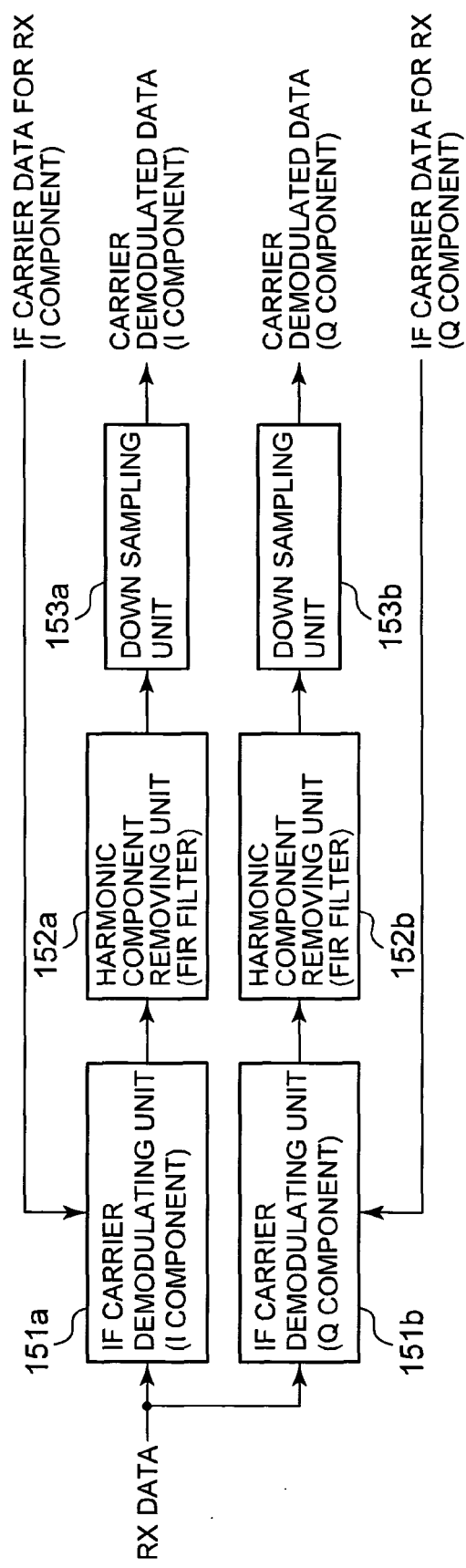
FIG. 2 is a block diagram illustrating a typical configuration of a carrier demodulating unit.

[Carrier Demodulating Unit 15: FIG. 2]

The carrier demodulating unit 15 will be described with reference to FIG. 2. FIG. 2 shows a block diagram illustrating a configuration of the carrier demodulating unit.

The carrier demodulating unit 15 removes an IF carrier component with respect to the receiving IF signal based on the IF carrier data which is input from the carrier data generating unit 16, and further down-samples the receiving IF signal from 512 kHz sampling (strictly speaking, 524,288 Hz) to 256 kHz sampling (strictly speaking, 262,144 Hz).

As shown in FIG. 2, the carrier demodulating unit 15 includes: an IF carrier demodulating unit 151a for receiving a receiving data (RX data) and modulating the receiving data with an IF carrier with respect to an in-phase component (I component); an IF carrier demodulating unit 151b for modulating the receiving data with the IF carrier with respect to an orthogonal component (Q component); a harmonic component removing unit 152a for removing harmonic components using an FIR (Finite Impulse Response) filter with respect to the I component demodulated with the IF carrier; a harmonic component removing unit 152b for removing harmonic component using an FIR filter with respect to the Q component demodulated with the IF carrier; a down sampling unit 153a for outputting I-component data demodulated with the carrier by down-sampling the I component without the harmonic components; and a down sampling unit 153b for outputting Q-component data demodulated with the carrier by down-sampling the Q component without the harmonic components.

Figure 3:
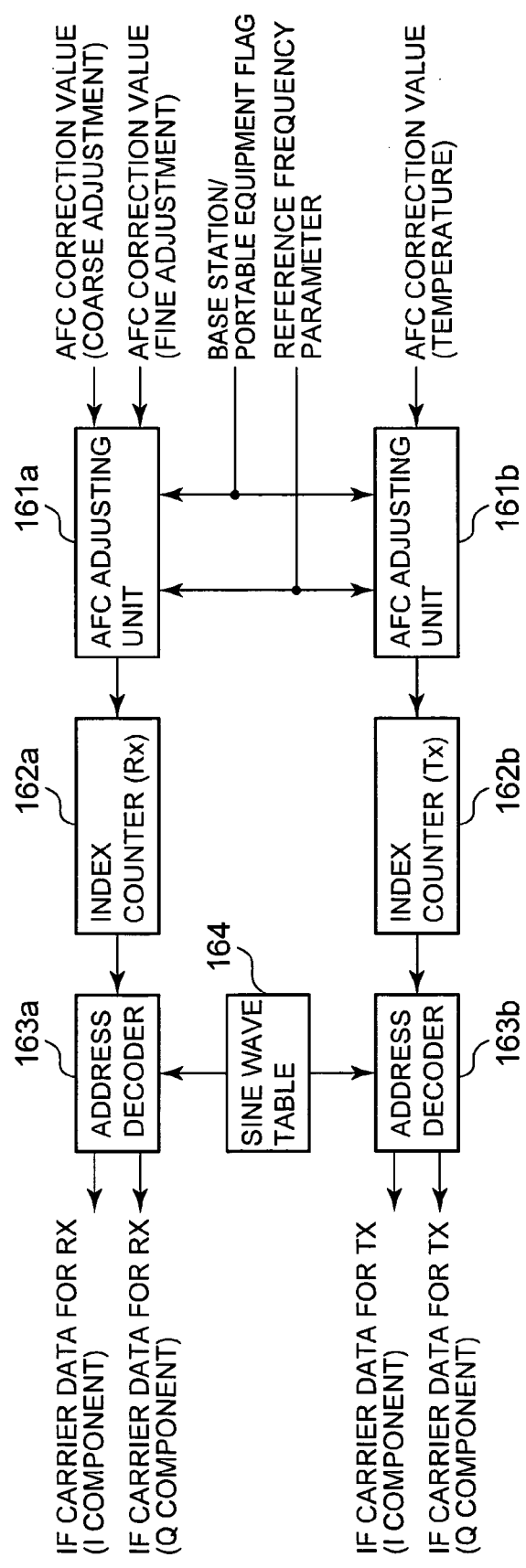
FIG. 3 is a block diagram illustrating a typical configuration of a carrier data generating unit.

[Carrier Data Generating Unit 16: FIG. 3]

The carrier data generating unit 16 will be described with reference to FIG. 3. FIG. 3 shows a block diagram illustrating a configuration of the carrier data generating unit.

The carrier data generating unit 16 generates carrier data to be supplied to the carrier modulating unit 17 and the carrier demodulating unit 15.

The two kinds of carrier data are generated with a 90° different phase with respect to transmission and reception.

Further, the carrier data generating unit 16 performs a frequency correction processing with respect to frequency deviation detection data from the coarse frequency deviation detecting unit 23 and the fine frequency deviation detecting unit 24, and AFC correction data from the APC/AFC control unit 13.

Specifically, as shown in FIG. 3, the carrier data generating unit 16 includes: an AFC adjusting unit 161a for performing an AFC adjustment with respect to an AFC correction value (coarse adjustment) input from the coarse frequency deviation detecting unit 23 and an AFC correction value (fine adjustment) input from the fine frequency deviation detecting unit 24 in the base on a base station/portable equipment flag input and a reference frequency parameter; an AFC adjusting unit 161b for performing the AFC adjustment with respect to the AFC correction value (temperature) input from the APC/AFC control unit 13 in the base on the base station/portable equipment flag input and the reference frequency parameter; an index counter (Rx) 162a for counting reception indexes with respect to data input from the AFC adjusting unit 161a; an index counter (Tx) 162b for counting transmission indexes with respect to data input from the AFC adjusting unit 161b; an address decoder 163a for decoding an address by the use of a count value of the index counter 162a based on a sine wave table 164 and outputting IF carrier data for Rx of the I component and IF carrier data for Rx of the Q component; and an address decoder 163b for decoding an address by the use of a count value of the index counter 162b based on the sine wave table 164 and outputting IF carrier data for Tx of the I component and IF carrier data for Tx of the Q component.

[Carrier Modulating Unit 17]

The carrier modulating unit 17 performs an APC correction processing according to an APC correction request from the APC/AFC control unit 13 with respect to the IF carrier data supplied from the carrier data generating unit 16.

Further, the carrier modulating unit 17 performs a carrier modulation by the IF carrier data with respect to spread modulating processing data (user data, synchronizing word/REF data) input from the spread modulating unit 21.

The data used as the IF carrier data is shifted in phase by 90° with respect to the user data and the synchronizing word/REF data.

Further, the carrier modulating unit 17 performs an addition processing in which each data subjected to the carrier modulation is added.

Figure 4:
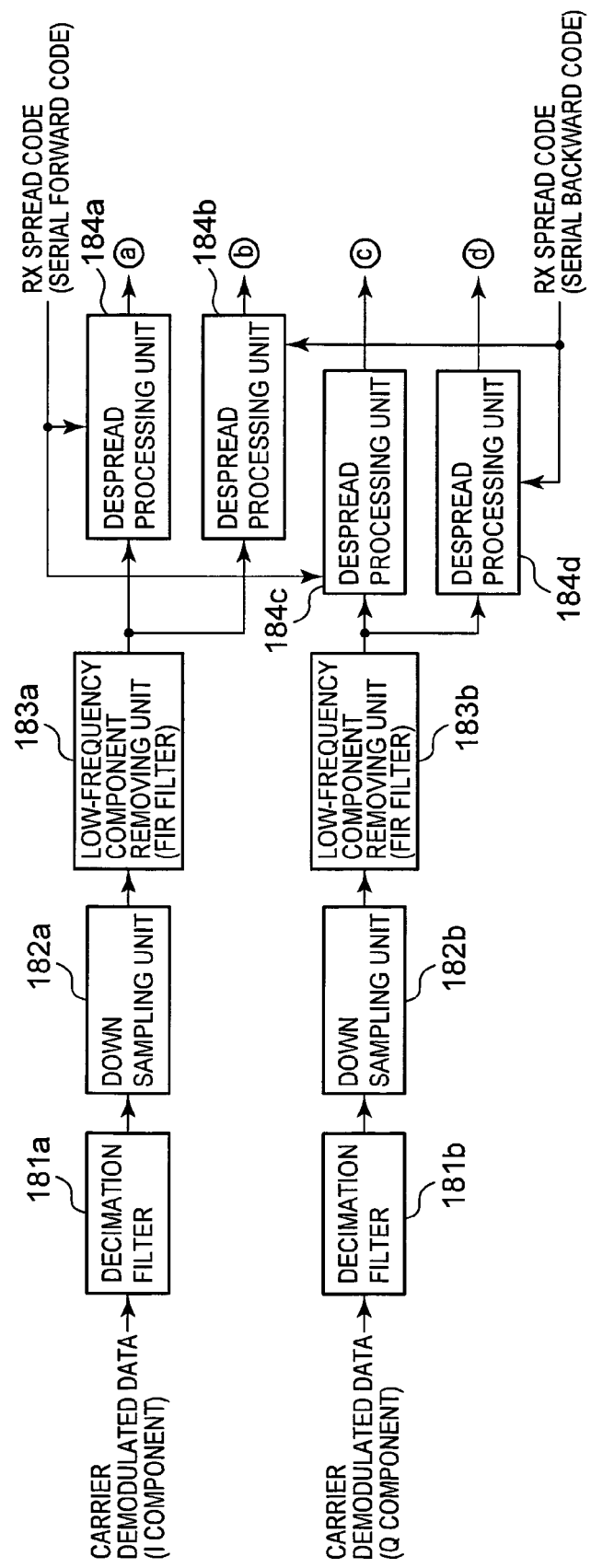
FIG. 4 is a block diagram illustrating a configuration of a former part of a receiving data demodulating unit.
Figure 5:
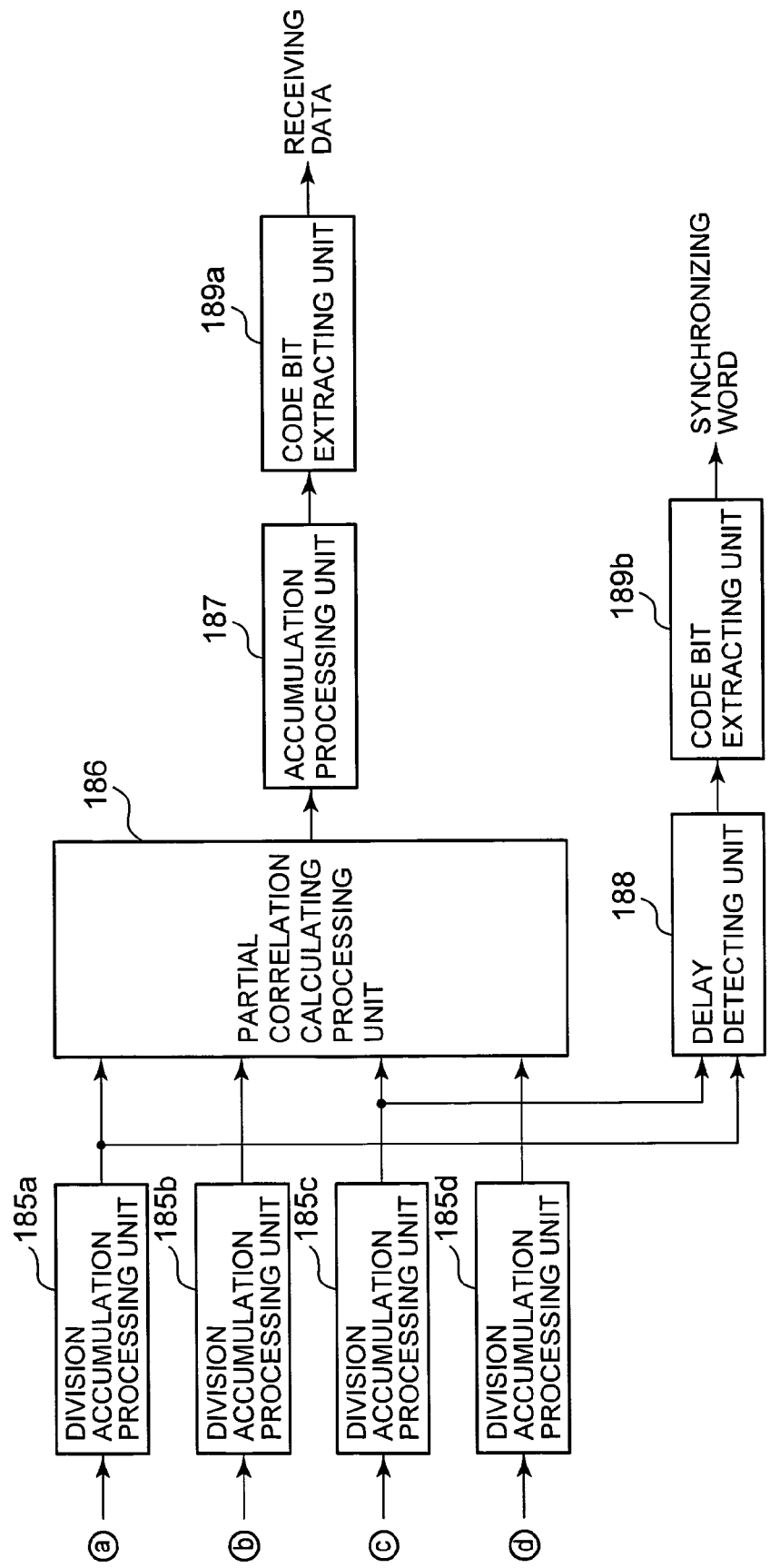
FIG. 5 is a block diagram illustrating a configuration of a latter part of a receiving data demodulating unit.

[Receiving Data Decoding Unit 18: FIG. 4, FIG. 5]

Next, the receiving data decoding unit 18 will be described with reference to FIGS. 4 and 5. FIG. 4 shows a block diagram illustrating a configuration of a former part of the receiving data decoding unit. FIG. 5 shows a block diagram illustrating a configuration of a latter part of the receiving data decoding unit. (a) to (d) in FIG. 4 are connected to (a) to (d) in FIG. 5, respectively.

The receiving data decoding unit 18 detects a synchronizing word and decodes the user data after performing fine correction of a synchronized IF carrier frequency.

Since the carrier demodulated data is data that is 8 times over-sampled (the carrier demodulated data is sampling data of 262,144 Hz with respect to a chip rate of 32,768 Hz), the carrier demodulated data is down-sampled to data of 32,768 Hz after a decimation filtering (moving average filter with 8 taps).

After down-sampling, the receiving data demodulating unit removes low-frequency components by an HPF (High Pass Filter=FIR filter).

Specifically, as shown in FIGS. 4 and 5, the receiving data decoding unit 18 includes: a decimation filter 181a for filtering I-component data modulated in carrier by the use of the moving average filter with 8 taps; a down sampling unit 182a for down-sampling the output of the decimation filter 181a; a low-frequency component removing unit 183a for removing low-frequency components with respect to the output from the down sampling unit 182a using the FIR filter; a decimation filter 181b for filtering Q-component data demodulated in carrier by the use of the moving average filter with 8 taps; a down sampling unit 182b for down-sampling the output from the decimation filter 181b; a low-frequency component removing unit 183b for removing low-frequency components with respect to the output of the down sampling unit 182b using the FIR filter; a despread processing unit 184a for despreading the output from the low-frequency component removing unit 183a by an RX spread code (serial forward code); a despread processing unit 184b for despreading the output from the low-frequency component removing unit 183a by an RX spread code (serial backward code); a despread processing unit 184c for despreading the output from the low-frequency component removing unit 183b by the RX spread code (serial forward code); a despread processing unit 184d for despreading the output from the low-frequency component removing unit 183b by the RX spread code (serial backward code); a division accumulation processing units 185a to 185d for dividing and accumulating the output from each of the despread processing units 184a to 184d; a partial correlation calculating processing unit 186 for calculating a partial correlation by adding the outputs from the division accumulation processing units 185a to 185d; an accumulation processing unit 187 for accumulating the output of the partial correlation calculating processing unit 186; a code bit extracting unit 189a for extracting a code bit from the output of the accumulation processing unit 187 and outputting the receiving data; a delay detecting unit 188 for receiving the outputs from the division accumulation processing units 185a and 185c and performing a delay detection; and a code bit extracting unit 189b for extracting the code bit from the output from the delay detecting unit 188 and outputting the synchronizing word.

The purpose of the receiving data decoding unit 18 performing the HPF processing with the low-frequency component removing units 183a and 183b is to remove interference components when continuous-wave (CW) interference waves are input in a signal bandwidth.

Such being the case in the signal bandwidth, signal components are also removed, but there is no degradation in sensitivity by setting a cutoff frequency of the HPF not to affect the signal bandwidth.

In the present signal processing unit, the cutoff frequency of the HPF is set to about 2.6 kHz with respect to the chip rate of 34,768 Hz (≈signal bandwidth).

After filtering in the receiving data decoding unit 18, the despread processing and the accumulation processing are performed by a sliding correlation processing.

An amount of the IF carrier frequency deviation is reduced to a level of accuracy within ±32 Hz by means of the fine frequency deviation detection and the correction. However, when a chip rate is 32,768 Hz and 512 chip/bit, a bit rate is 64 bps and an allowable value of residual frequency components after carrier demodulation becomes ±16 Hz. Therefore, the accuracy is not yet sufficient.

Therefore, a division correlation processing is performed in the correlation processing (sliding correlation processing). Although two divisions are enough in theory, the correlation processing is made of four divisions in the present signal processing unit in consideration of a margin.

As described above in connection with the spread modulating unit 21 in detail, decoding of the user data depends on a relative position relationship with the synchronizing word/REF data.

Further, the synchronizing word is detected from the synchronizing word/REF data component at the same time. The detection is performed by the delay detecting unit. However, since the division correlation processing is being performed, 2-stage delay detecting processing comes to be performed instead of normal delay detecting processing.

Figure 6:
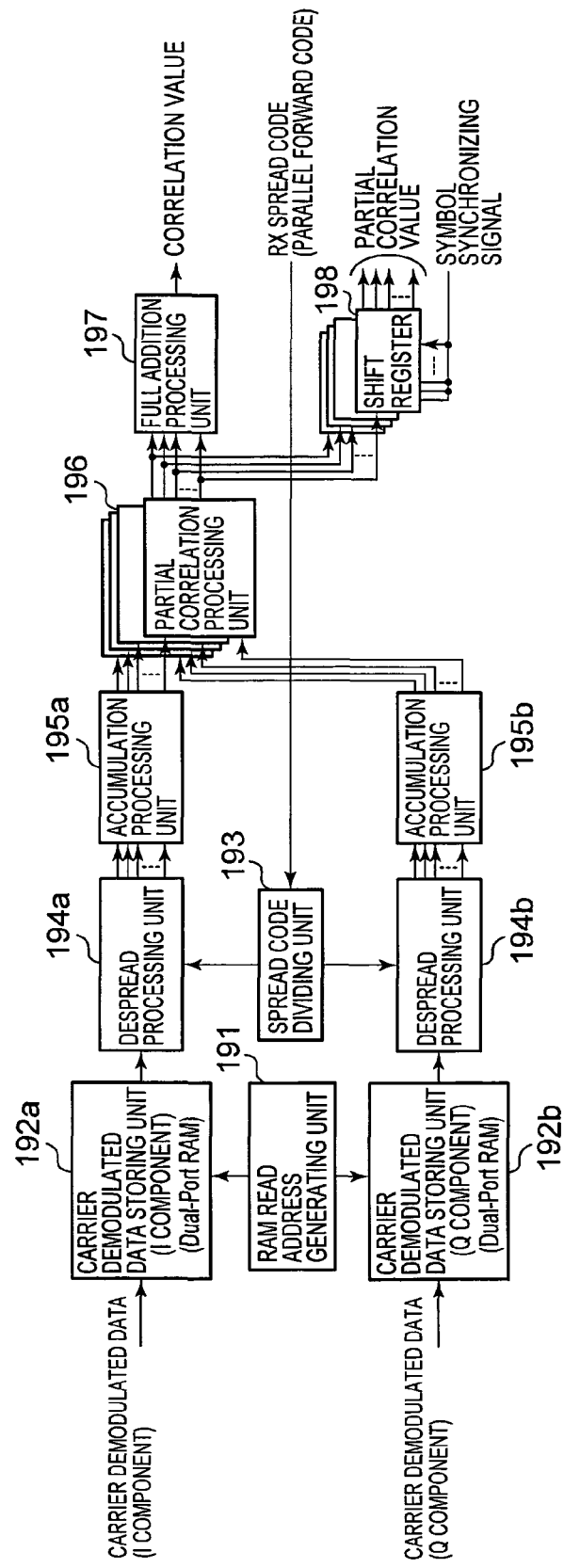
FIG. 6 is a block diagram illustrating a configuration of a matched filter unit.

[Matched Filter Unit 19: FIG. 6]

Next, the matched filter unit 19 will be described with reference to FIG. 6. FIG. 6 shows a block diagram illustrating a configuration of the matched filter unit.

The matched filter unit 19 performs the despread processing and further the full addition processing as the correlation processing by matched-filtering with respect to the carrier demodulated data.

Specifically, as shown in FIG. 6, the matched filter unit 19 includes: a carrier demodulated data storing unit 192a formed of a dual-port RAM (Random Access Memory) for storing I-component data modulated in carrier according to the address output from the RAM read address generating unit 191; a carrier demodulated data storing unit 192b formed of a dual-port RAM for storing Q-component data modulated in carrier according to an address output from the RAM read address generating unit 191; a spread code dividing unit 193 for dividing and outputting a spread code; a despread processing unit 194a for despreading the carrier modulated data output from the carrier demodulated data storing unit 192a by the use of the divided spread code; a despread processing unit 194b for despreading the carrier modulated data output from the carrier demodulated data storing unit 192b by the use of the divided spread code; an accumulation processing unit 195a for performing the accumulating operation with respect to the output from the despread processing unit 194a; an accumulation processing unit 195b for performing the accumulating operation with respect to the output from the despread processing unit 194b; a partial correlation calculating processing unit 196 for calculating the output from the accumulation processing units 195a and 195b by being partially correlated; a full addition processing unit 197 for fully adding the output from the partial correlation calculating processing unit 196; and a shift register 198 for temporarily storing the output from the partial correlation calculating processing unit 196 and outputting as a partial correlation value by the symbol synchronizing signal.

Figure 7:
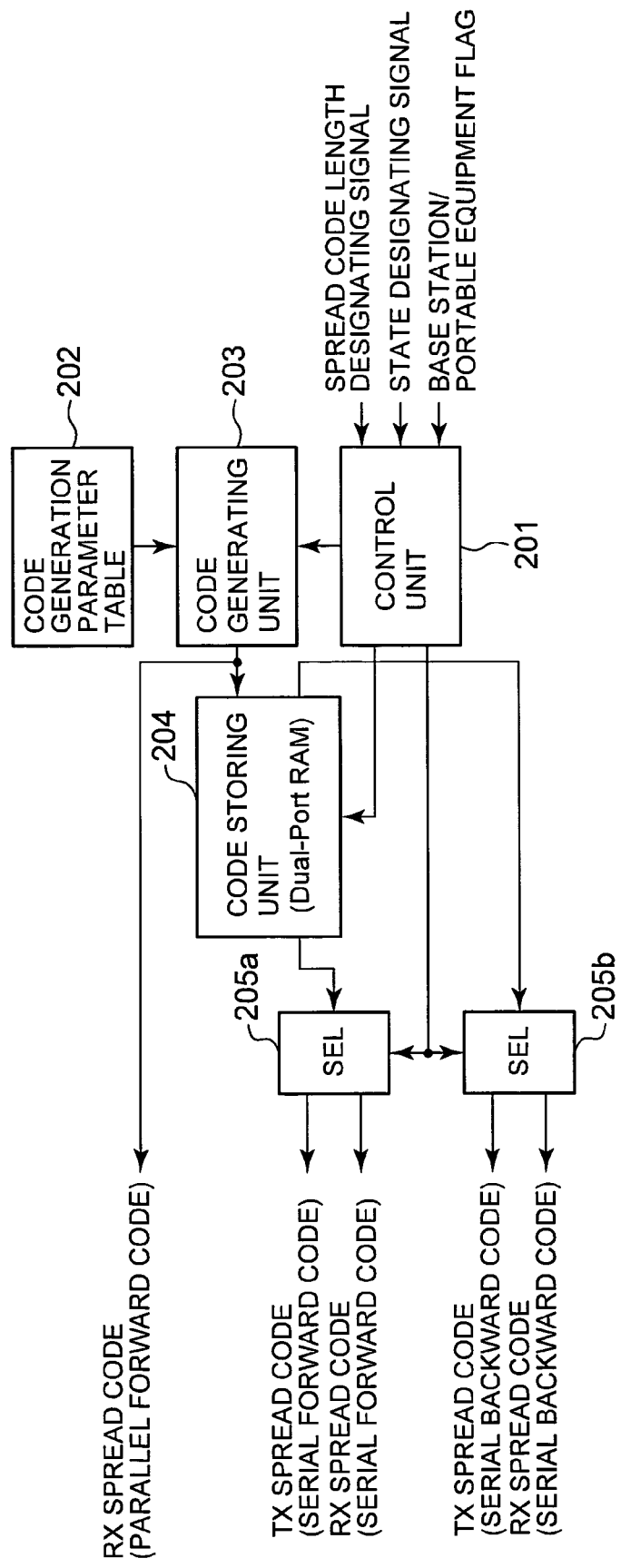
FIG. 7 is a block diagram illustrating a typical configuration of a spread code generating unit.

[Spread Code Generating Unit 20: FIG. 7]

Next, the spread code generating unit 20 will be described with reference to FIG. 7. FIG. 7 shows a block diagram illustrating a configuration of the spread code generating unit.

The spread code generating unit 20 generates a spread code for the spread modulation and the despread processing.

Specifically, as shown in FIG. 7, the spread code generating unit 20 includes: a control unit 201 for receiving a spread code length designating signal, a state designating signal, and a base station/portable equipment flag and outputting a control signal; a code generating unit 203 for generating a spread signal by the control signal from the control unit 201 and a parameter from a code generation parameter table 202 and outputting the RX spread code (parallel forward code); a code storing unit 204 formed of a dual-port RAM for receiving and storing the spread signal from the code generating unit 203 by the control signal from the control unit 201 and further outputting the stored spread signal; a selector (SEL) 205a for outputting the code from the code storing unit 204 by selecting a TX spread code (serial forward code) or an RX spread code (serial forward code) according to the control signal from the control unit 201; and a selector (SEL) 205b for outputting the code from the code storing unit 204 by selecting the TX spread code (serial backward code) or the RX spread code (serial backward code) according to the control signal from the control unit 201.

The spread code generating unit 20 generates the spread code in a length of 512 chips at starting up the system, which is stored to the code storing unit 204.

The two kinds of spread signals to be used are necessary for the synchronizing word/REF data and for the user data. It is also possible for these two kinds of signals to be generated from each of the parameters, but in the present signal processing unit, a code generated by one kind of parameter is used, which is arranged forward and backward so as to be used in a quite different code.

That is, the SEL 205a receives the TX spread code (serial forward code) or the RX spread code (serial forward code) from the code storing unit 204, and the SEL 205b receives the TX spread code (serial backward code) or the RX spread code (serial backward code) by reversing the same data from the code storing unit 204, and selects and outputs any one of both according to the control signal from the control unit 201.

Specifically, when addresses for reading out the codes stored in the RAM are read out sequentially from 0 to 511 and when read out sequentially from 511 to 0, the different codes are utilized. Therefore, it is possible to reduce storage capacity of the TRAM to ½ capacity.

Figure 8:
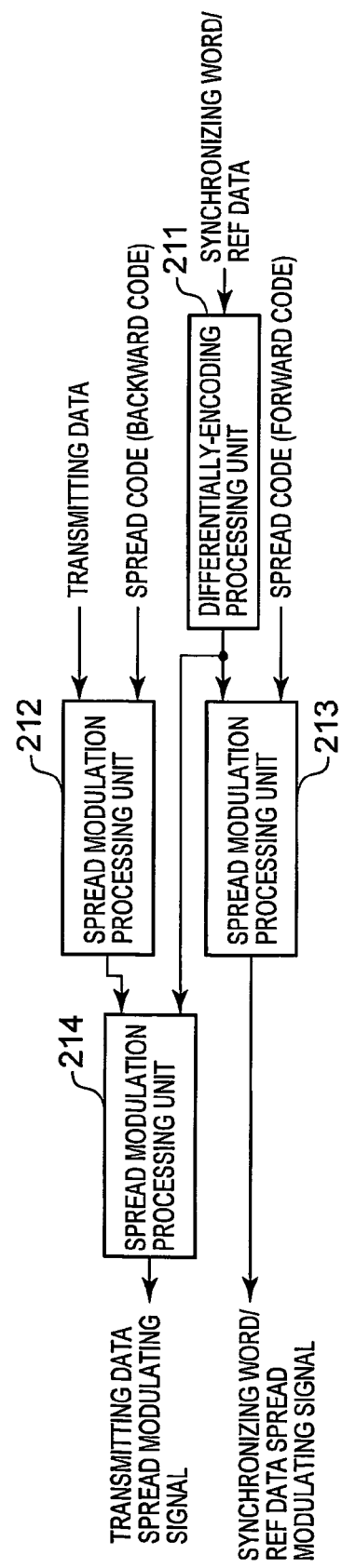
FIG. 8 is a block diagram illustrating a typical configuration of a spread modulating unit.

[Spread Modulating Unit 21: FIG. 8]

Next, the spread modulating unit 21 will be described with reference to FIG. 8. FIG. 8 shows a block diagram illustrating a configuration of the spread modulating unit.

The spread modulating unit 21 performs a differentially-encoding processing with respect to the synchronizing word/REF data, performs a spread modulation processing with respect to the synchronizing word/REF data subjected to the differentially-encoding processing and the transmission user data.

Specifically, as shown in FIG. 8, the spread modulating unit 21 includes: a differentially-encoding processing unit 211 for receiving the synchronizing word/REF data and performing the differentially-encoding processing; a spread modulation processing unit 212 for receiving the transmitting data and the spread code (backward code) and performing the spread modulation processing; a spread modulation processing unit 213 for receiving the data encoded differentially from the differentially-encoding processing unit 211 and the spread code (forward code), performing the spread modulation processing, and outputting a synchronizing word/REF data spread modulating signal; and a spread modulation processing unit 214 for receiving a signal modulated diffusely from a spread modulation processing unit 212 and the data encoded differentially from the differentially-encoding processing unit 211, performing the spread modulation processing, and outputting a transmitting data spread modulating signal.

Figure 9:
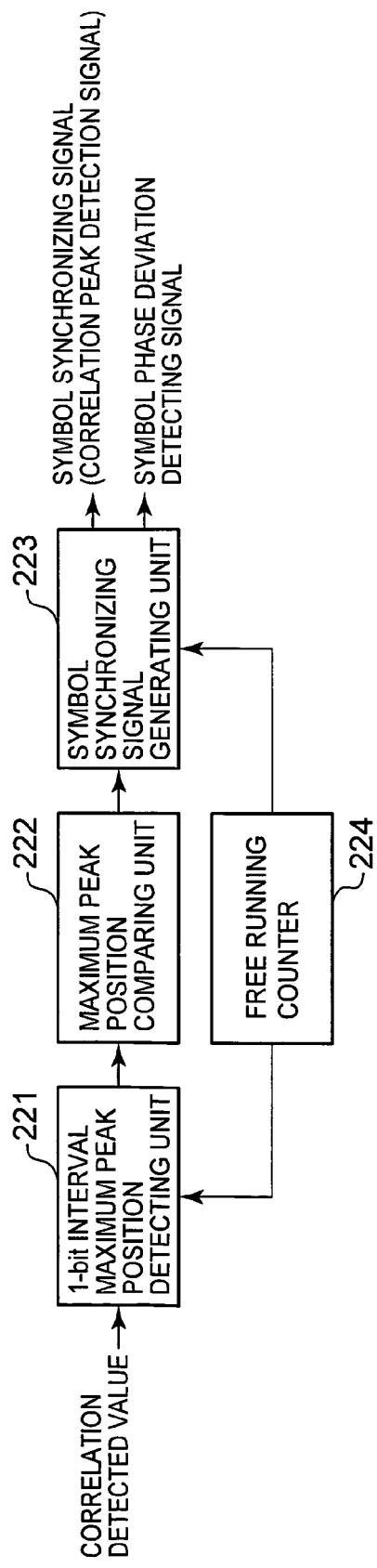
FIG. 9 is a block diagram illustrating a typical configuration of a correlation peak detecting unit.

[Correlation Peak Detecting Unit 22: FIG. 9]

Next, the correlation peak detecting unit 22 will be described with reference to FIG. 9. FIG. 9 shows a block diagram illustrating a configuration of the correlation peak detecting unit.

As shown in FIG. 9, the correlation peak detecting unit 22 includes: a 1-bit interval maximum peak position detecting unit 221 for receiving the correlation detected value from the matched filter unit 19 and detecting a maximum bit position in a 1-bit interval as a counter value; a maximum peak position comparing unit 222 for comparing the counter value at the detected maximum peak position with a counter value at a previous maximum peak position and outputting the comparison result; a symbol synchronizing signal generating unit 223 for outputting a symbol synchronizing signal (correlation peak detection signal: synchronizing detection signal) to the outside and the control unit 25 if the correlation peak is detected from the received comparison result, and outputting a symbol phase deviation detecting signal with respect to the symbol phase deviation to the fine frequency deviation detecting unit 24; and a free running counter 224 for outputting a free running counter value.

The correlation peak detecting unit 22 performs correlation peak detection according to the following sequence with respect to the correlation detected data from the matched filter unit 19.

First, the free running counter 224 is started up from the start of a detection processing.

The free running counter 224 is a counter of 4,096=12 bit in 256 kHz/1 bit-length=512 chip/bit.

Second, the 1-bit interval maximum peak position detecting unit 221 detects the maximum correlation value for every 1-bit interval from the start of the detection processing, and stores a counter value in a memory whenever the maximum value is updated.

Third, when the detection of the maximum value is completed in 2-bit intervals from the start of the detection processing, the maximum peak position comparing unit 222 compares counter values of the correlation maximum value in the 2-bit intervals for every interval, and outputs the comparison result to the symbol synchronizing signal generating unit 223.

The symbol synchronizing signal generating unit 223 determines that the comparison result is a correlation peak in high reliability when the deviation is in a predetermined range (about ±3 to 4 counts), and sends out the symbol synchronizing signal (correlation peak detecting signal).

Further, even though the original signal is not received (only noise is received), when the symbol synchronizing signal generating unit 223 detects the peak in the counter values, for example, in a range of ±4 counts, there is an error in 262,144 detections because the probability becomes $(8/4,096)^2=1/262,144$. Specifically, the shorter the chip length becomes, the higher the probability of the error in detection becomes.

Therefore, the signal processing unit detects the peak when the counter values are within a predetermined range in 3-bit continuation instead of 2-bit continuation. The probability of error in detection is lowered to $(8/4,096)^3=1/134,217,728$.

[Characteristic of Correlation Peak Detecting Unit]

In the peak detection processing of the correlation peak detecting unit 22 in the signal processing unit, since it is not necessary to provide a threshold value between the peak and the noise, there is no loss (sensitivity degradation) due to the threshold value setting.

Therefore, the correlation peak detecting unit 22 is allowed to carry out the peak detection up to a limit level where the peak value is disappeared (that is, buried in the noise) by the weak electric field.

Further, even though the counter value of the correlation maximum in the 1-bit interval is different, the peak detection processing is carried out within a period of time (for example, 8 counts) allowed in terms of the system configuration. Therefore, a recover is possible and the detection sensitivity can be further increased.

Further, the symbol synchronizing signal generating unit 223 delivers the symbol synchronizing signal to the control unit 25, so that the control unit 25 performs the symbol synchronizing processing.

By the above-mentioned processing, the free running counter 224 continues to start even after the correlation peak is detected, so that the following detection processing of a clock phase error is carried out. Further, the clock phase error means that a bit synchronization is deviated from several tens of msec to several hundreds of msec in communication due to the frequency deviation of processing clocks between the base station and the portable equipment.

The detection processing of the clock phase error, first, secures a counter value (if not the same value, an average value of these) upon detecting the correlation peak as a reference value of the clock phase error detection.

Second, even after the synchronization is established, the matched filter unit 19 is periodically started so as to carry out the detection processing of the correlation value.

Third, the maximum correlation value detection in a range of several counts (about ±8 counts) before and after the counter reference value secured in the first processing is carried out. Then, the counter value of the obtained maximum value is compared with the counter reference value.

Fourth, when the counter reference value becomes a different value, a difference value thereof is delivered to the control unit 25 as a phase error value.

The control unit 25 carries out a phase adjusting processing of the processing clock according to the phase error value.

Figure 10:
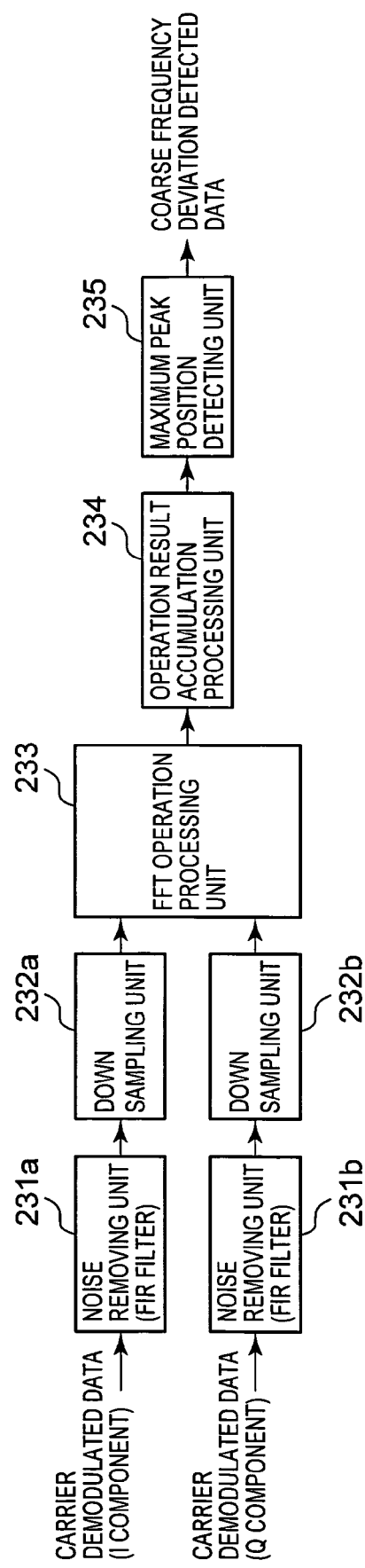
FIG. 10 is a block diagram illustrating a typical configuration of a coarse frequency deviation detecting unit.

[Coarse Frequency Deviation Detecting Unit 23: FIG. 10]

Next, the coarse frequency deviation detecting unit 23 will be described with reference to FIG. 10. FIG. 10 shows a block diagram illustrating a configuration of the coarse frequency deviation detecting unit.

The coarse frequency deviation detecting unit 23 removes noises with an LPF (Low Pass Filter) with respect to the carrier modulated data to be down-sampled, accumulates the data by performing the FFT operation, detects the maximum peak position, and outputs coarse frequency deviation detected data.

As shown in FIG. 10, the coarse frequency deviation detecting unit 23 includes: a noise removing unit 231*a* for receiving I-component data modulated in carrier and removing noises using the FIR filter as the LPF; a noise removing unit 231*b* for receiving Q-component data modulated in carrier and removing noises using the FIR filter as the LPF; a down sampling unit 232*a* for down-sampling the I component without noises; a down sampling unit 232*b* for down-sampling the Q component without noises; an FFT operation processing unit 233 for performing the FFT operation with respect to the down-sampled I component and the down-sampled Q component; an operation result accumulation processing unit 234 for accumulating results of the FFT operation; and a maximum peak position detecting unit 235 for detecting the maximum peak position from the accumulated results.

In the down sampling units 232*a* and 232*b*, the data after removing noises is down-sampled with 32,768 Hz.

Residual frequency components according to the IF carrier frequency deviation amount between the base station and the portable equipment is detected with respect to the data after down-sampling.

The detection of the residual frequency components is performed by a 32-point FFT operation. Therefore, the accuracy of the detection frequency becomes 1,024 Hz.

In the present signal processing unit, the peak detection is performed after the several detection results are accumulated in order to increase the detection accuracy.

One period of operation is 32/32,768≈1 msec, and the accumulation is able to be made up to 32 periods.

When the 32 periods of accumulation are performed, the detection sensitivity increases up to about 15 dB in theory.

The detected coarse frequency deviation amount is supplied to the carrier data generating unit 16.

Figure 11:
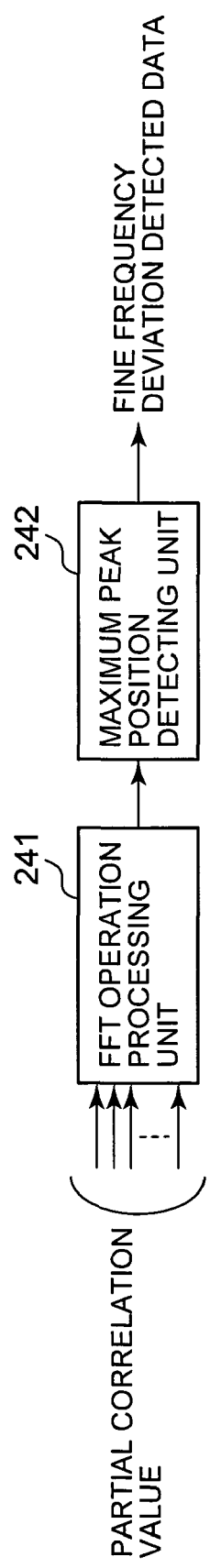
FIG. 11 is a block diagram illustrating a configuration of a fine frequency deviation detecting unit.
Figure 12:
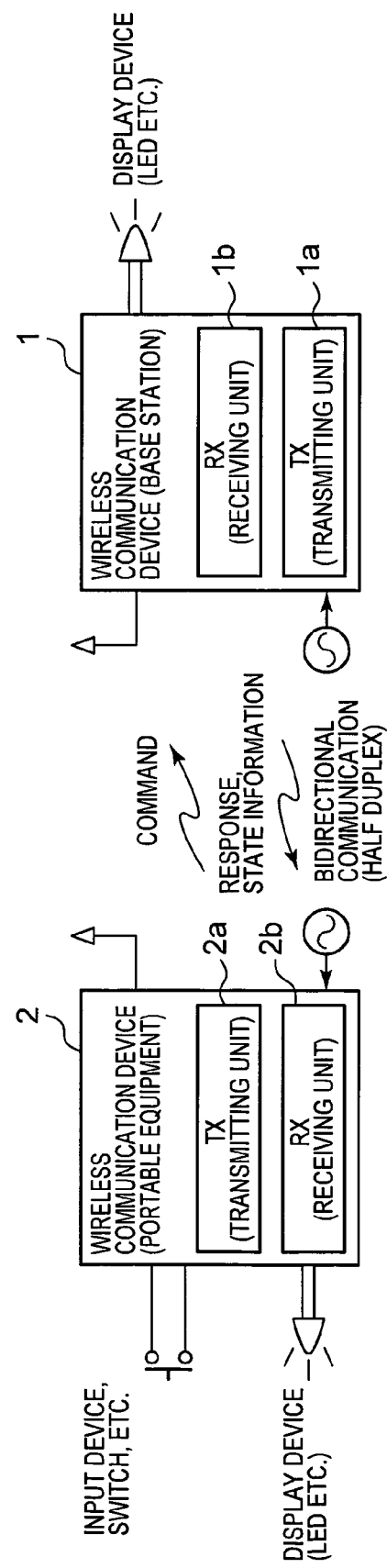
FIG. 12 is a schematic diagram illustrating a conventional bidirectional wireless system.
Figure 13:
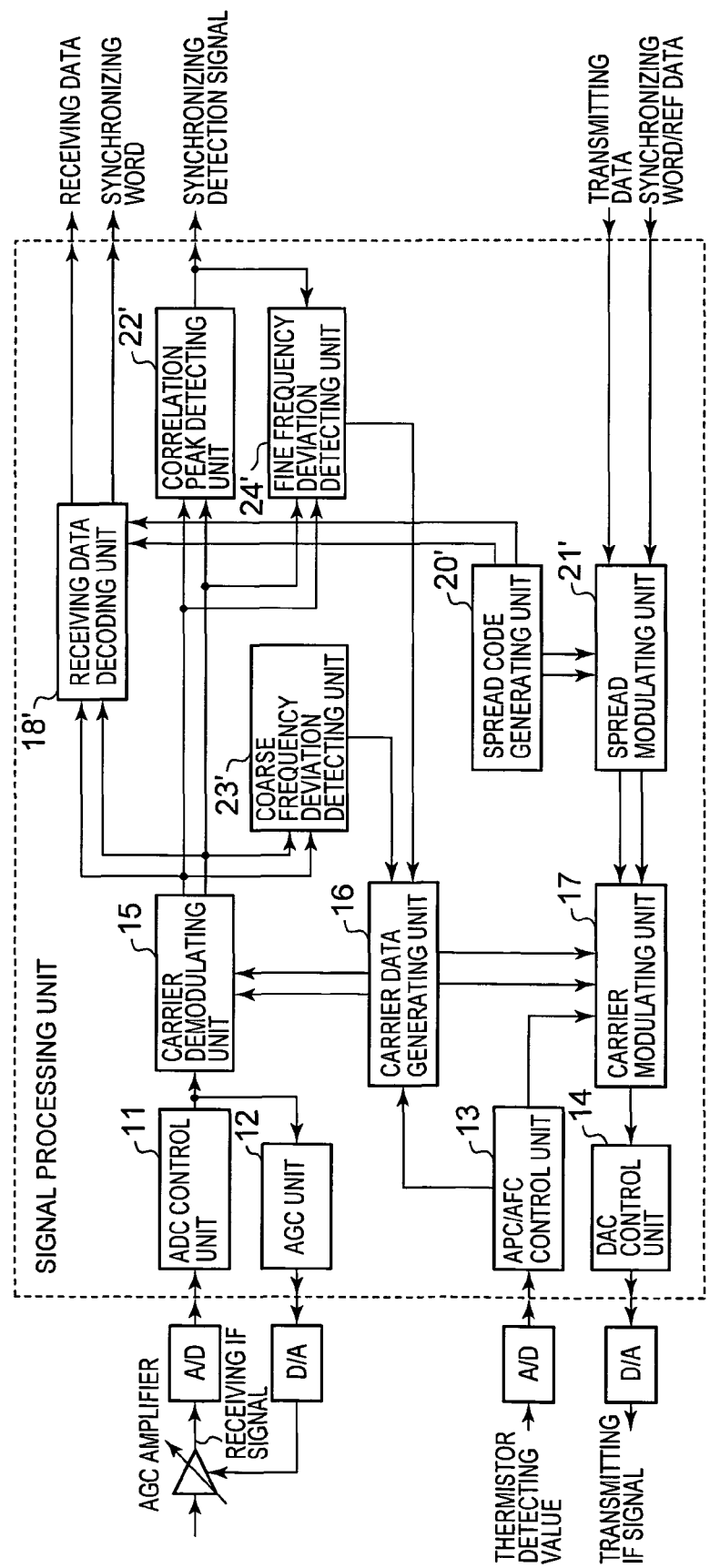
FIG. 13 is a block diagram illustrating a general configuration of a conventional signal processing unit.

[Fine Frequency Deviation Detecting Unit 24: FIG. 11]

Next, the fine frequency deviation detecting unit 24 will be described with reference to FIG. 11. FIG. 11 shows a block diagram illustrating a configuration of the coarse frequency deviation detecting unit.

The fine frequency deviation detecting unit 24 detects a frequency in high accuracy in order to reduce the frequency deviation amount for the purpose of reduction in degradation of division loss (sensitivity degradation due to division) by the division correlation processing before decoding the data in the receiving data decoding unit 18.

As shown in FIG. 11, the fine frequency deviation detecting unit 24 includes an FFT operation processing unit 241 which receives the partial correlation processing and performs the FFT operation and a maximum peak position detecting unit 242 which detects the maximum peak position from the FFT operation results and outputs fine frequency deviation detected data.

The FFT operation processing unit 241 performs the same 32-point FFT operation as that of the FFT operation processing unit 233 of the coarse frequency deviation detecting unit 23. However, in this case, 32-divided correlation processing data when the correlation peak is detected is used for performing operation.

After correcting the coarse frequency deviation, residual deviation components of 512 Hz at maximum also remains in the carrier demodulated data. The residual deviation components appear in the 32-divided correlation detected data when the peak is detected.

For this reason, it is possible to detect frequencies of the residual deviation amount by performing the FFT operation with respect to the corresponding correlation data (32 division*I, Q component=64 points) when the peak is detected.

The detection accuracy at that time becomes 64 Hz, since a sampling period of one division amount is 16/32,768≈0.5 msec, Δf=1/0.5 msec*32=64 Hz.

The obtained fine frequency deviation value is supplied to the carrier data generating unit 16.

Further, the fine frequency deviation detecting unit 24 is able to be used together thanks to having the same 32-point FFT operation as that of the coarse frequency deviation detecting unit 23.

[Control Unit 25]

The control unit 25 receives the synchronous detection signal from the correlation peak detecting unit 22, performs a symbol synchronizing processing, and controls operation timing of the correlation peak detecting unit 22 and the coarse frequency deviation detecting unit 23 by an external input.

Especially, the control unit 25 adjusts phase of clock supplied to each part in the signal processing unit according to the phase error value from the correlation peak detecting unit 22.

[Flow of Reception Processing]

Hereinafter, a flow of the reception processing will be described briefly.

First, in the start of reception processing, a carrier demodulating processing is performed by the carrier demodulating unit 15 through the ADC control unit 11.

Second, carrier demodulating processing data is supplied to the coarse frequency deviation detecting unit 23 and the matched filter unit 19; the coarse frequency deviation detecting unit 23 detects the coarse frequency deviation amount; at the same time, the matched filter unit 19 and the correlation peak detecting unit 22 perform a correlation processing and a correlation peak detecting processing, respectively.

Third, when the coarse frequency deviation is detected, the carrier data generating unit 16 and the carrier demodulating unit 15 correct the deviation amount, and perform again the correlation peak detecting processing.

Fourth, when detecting the correlation peak, the correlation peak detecting unit 22 supplies each detected value (32 division amount, I,Q components; 64 points in total) of the division correlation, which corresponds to the peak value, to the fine frequency deviation detecting unit 24, and detects the fine frequency deviation amount.

Fifth, the carrier data generating unit 16 and the carrier demodulating unit 15 correct again the IF carrier frequency from the detection result of the fine frequency deviation amount, and then the receiving data decoding unit 18 detects the synchronizing word and further decodes the receiving data.

The above-mentioned flow is an outline of the reception processing in the present signal processing unit.

Effect of Embodiment

According to the signal processing unit and the wireless communication device adopted with the signal processing unit, it is possible to effectively enhance the detection sensitivity in the correlation peak detecting processing.

The present invention is applicable to a signal processing unit and a wireless communication device, which is able to enhance sensitivity in a correlation peak detecting processing.

What is claimed is:

1. A signal processing unit which is adapted for use in a wireless communication device, comprising:
a carrier data generating unit configured to carry out a frequency correction according to a frequency deviation amount to be received as an input and to generate carrier data;
a carrier demodulating unit configured to demodulate a carrier of a received signal based on the carrier data and to output the carrier demodulated data;
a matched filter unit configured to calculate, for the carrier demodulated data, a plurality of division correlation values by dividing said carrier demodulated data and by further performing a despread processing and an accumulating operation processing as a partial correlation processing and to carry out a full addition processing on the plurality of division correlation value, to thereby output correlation detected value while outputting the plurality of division correlation values as a partial correlation detected value due to detection of a correlation peak;
a correlation peak detecting unit configured to receive the correlation detected value as an input, to detect a maximum peak position in a 1-bit interval, and to compare the maximum peak position with a previous maximum peak position, wherein when the correlation peak is detected from the comparison result, the correlation peak detecting unit outputs position information of the correlation peak;
a coarse frequency deviation detecting unit configured to carry out an FFT (Fast Fourier Transform) operation on the carrier demodulated data, to detect a frequency component according to a carrier frequency deviation amount, and to output a frequency deviation amount to the carrier data generating unit;
a fine frequency detecting unit configured to carry out the FFT operation on the partial correlation detected value upon detecting the correlation peak and to output a fine frequency deviation amount which reduces the frequency deviation amount to the carrier data generating unit; and a control unit configured to receive the position information of the correlation peak as an input and to adjust a processing clock which becomes an operation timing in the correlation peak detecting unit and the coarse frequency deviation detecting unit.

2. The signal processing unit according to claim 1, wherein the correlation peak detecting unit comprises:

a counter configured to output a counter value;

a 1-bit interval maximum peak position detecting unit configured to receive a correlation detected value as an input from the matched filter unit and to detect a maximum peak position in a 1-bit interval by the counter value;

a maximum peak position comparing unit configured to compare the counter value at the detected maximum peak position with a counter value at a previous maximum peak position and to output the comparison result; and a symbol synchronizing signal generating unit configured to output a correlation peak detected signal when the correlation peak is detected from the comparison result, and to output a symbol phase deviation detecting signal to the control unit when there is a symbol phase deviation.

3. The signal processing unit according to claim 2, wherein the 1-bit interval maximum peak position detecting unit is configured to detect a maximum correlation value every 1-bit interval from a start of detection processing and to carry out a processing for storing the counter value in an internal memory every time a maximum value is updated;

the maximum peak position comparing unit, after the detection of the maximum value over a 2-bit interval is completed from the start of detection processing, is configured to compare a counter value at the maximum correlation value in the 2-bit interval with that in every interval and to output the comparison result to the symbol synchronous signal generating unit; and the symbol synchronizing signal generating unit, when the comparison result is in a predetermined range of deviation, determines that the comparison result is the correlation peak, and delivers a correlation peak detection signal.

4. The signal processing unit according to claim 3, wherein the symbol synchronizing signal generating unit, when the comparison result is in the predetermined range of deviation over continuous 3 bits, determines that the comparison result is the correlation peak.

5. The signal processing unit according to claim 3, wherein the 1-bit interval maximum peak position detecting unit secures the counter value upon carrying out the correlation peak detection as a reference value in a detection processing of a clock phase error;

when the counter value of the maximum peak position detected after securing the reference value is in a range of predetermined values before and after the secured reference value, the maximum peak position comparing unit compares the counter value of the maximum peak position with the reference value;

when the counter value at the maximum peak position is different from the reference value, the symbol synchronizing signal generating unit delivers the symbol phase deviation detecting signal, in which the difference between the counter value and the reference value is set as a phase error value, to the control unit; and the control unit carries out a phase adjustment processing on a processing clock according to the symbol phase deviation detecting signal as the phase error value.

6. The signal processing unit according to claim 4, wherein the 1-bit interval maximum peak position detecting unit secures the counter value upon carrying out the correlation peak detection as a reference value in a detection processing of a clock phase error;

when the counter value of the maximum peak position detected after securing the reference value is in a range of predetermined values before and after the secured reference value, the maximum peak position comparing unit compares the counter value of the maximum peak position with the reference value;

when the counter value at the maximum peak position is different from the reference value, the symbol synchronizing signal generating unit delivers the symbol phase deviation detecting signal, in which the difference between the counter value and the reference value is set as a phase error value, to the control unit; and the control unit carries out a phase adjustment processing on a processing clock according to the symbol phase deviation detecting signal as the phase error value.

7. A wireless communication device comprising the signal processing unit according to claim 1.

8. A wireless communication device comprising the signal processing unit according to claim 2.

9. A wireless communication device comprising the signal processing unit according to claim 3.

10. A wireless communication device comprising the signal processing unit according to claim 4.

11. A wireless communication device comprising the signal processing unit according to claim 5.

12. A wireless communication device comprising the signal processing unit according to claim 6.

* * * * *